US012732977B2

(12) United States Patent
Ki et al.

(10) Patent No.: US 12,732,977 B2
(45) Date of Patent: Sep. 8, 2026

(54) ELECTRONIC DEVICE INCLUDING ANTENNA MODULE TO OUTPUT SIGNAL BASED ON SPECIFIC ABSORPTION RATE IN COMMUNICATION SYSTEM, AND METHOD OF OPERATING SAME

(71) Applicant: SAMSUNG ELECTRONICS CO., LTD., Suwon-si (KR)

(72) Inventors: Wooram Ki, Suwon-si (KR); Yongsang Yun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/344,862

(22) Filed: Jun. 30, 2023

(65) Prior Publication Data

US 2023/0345443 A1 Oct. 26, 2023

Related U.S. Application Data

(63) Continuation of application No. PCT/KR2021/014798, filed on Oct. 21, 2021.

(30) Foreign Application Priority Data

Jan. 14, 2021 (KR) ........................ 10-2021-0005443

(51) Int. Cl.
*H04W 52/34* (2009.01)
*H04W 52/36* (2009.01)
(Continued)

(52) U.S. Cl.
CPC ..... *H04W 72/0453* (2013.01); *H04W 52/367* (2013.01); *H04W 72/02* (2013.01); *H04W 72/51* (2023.01)

(58) Field of Classification Search
CPC ........... H04W 72/0453; H04W 52/367; H04W 72/02; H04W 72/51; H04W 52/283;
(Continued)

(56) References Cited

U.S. PATENT DOCUMENTS 8,041,380 B2 10/2011 Hamdi et al.
8,781,437 B2 7/2014 Ngai et al.
(Continued)

FOREIGN PATENT DOCUMENTS

EP 3744134 A1 12/2020
KR 1020120012042 A 2/2012
(Continued)

OTHER PUBLICATIONS

International Search Report mailed Jan. 20, 2022 for PCT/KR2021/014798.

(Continued)

*Primary Examiner* — Christopher T Wyllie
*Assistant Examiner* — Tracy L Williams
(74) *Attorney, Agent, or Firm* — CANTOR COLBURN LLP

(57) ABSTRACT

An electronic device includes: a sensor module; an antenna module; and a processor electrically connected to the sensor module and the antenna module. The processor is configured to: identify a frequency band, identify a spaced distance from the antenna module to a user measured by the sensor module, and determine a power value of a transmission signal for being transmitted through the frequency band based on the frequency band and the spaced distance, and the antenna module is configured to output the transmission signal through the frequency band by using the antenna module.

10 Claims, 12 Drawing Sheets

(51) Int. Cl.

| | |
|---|---|
| ***H04W 72/02*** | (2009.01) |
| ***H04W 72/0453*** | (2023.01) |
| ***H04W 72/51*** | (2023.01) |

(58) Field of Classification Search

CPC ..... H04W 52/34; H04B 1/005; H04B 1/3838; H04B 1/3827; H04B 2001/0416; H01Q 1/243

USPC .......................................................... 370/329

See application file for complete search history.

(56) References Cited

U.S. PATENT DOCUMENTS

| | | | | |
|---|---|---|---|---|
| 8,798,664 | B2 | 8/2014 | Yun | |
| 9,257,738 | B2 | 2/2016 | Lim et al. | |
| 9,531,420 | B1 | 12/2016 | Prendergast et al. | |
| 9,532,322 | B2 | 12/2016 | Yu et al. | |
| 9,769,826 | B2 | 9/2017 | Hoirup | |
| 9,867,139 | B1 * | 1/2018 | Khasgiwala | H04B 17/318 |
| 9,883,462 | B2 | 1/2018 | Lee et al. | |
| 9,986,533 | B2 | 5/2018 | Lee et al. | |
| 10,004,048 | B2 | 6/2018 | Komulainen et al. | |
| 2008/0268892 | A1 | 10/2008 | Hamdi et al. | |
| 2012/0077538 | A1 * | 3/2012 | Yun | H04W 52/52 455/522 |
| 2013/0090072 | A1 * | 4/2013 | Lim | H01Q 9/0421 455/77 |
| 2015/0111608 | A1 * | 4/2015 | Kazmi | H04W 52/367 455/522 |
| 2017/0250718 | A1 | 8/2017 | Choi et al. | |
| 2017/0273034 | A1 | 9/2017 | Colombi et al. | |
| 2017/0289929 | A1 * | 10/2017 | Komulainen | G01V 3/08 |
| 2018/0212310 | A1 * | 7/2018 | Tsai | H01Q 1/52 |
| 2018/0288707 | A1 * | 10/2018 | Jeon | H04W 52/346 |
| 2019/0356349 | A1 * | 11/2019 | Lan | H04W 52/24 |
| 2020/0389856 | A1 * | 12/2020 | Yao | H04B 17/318 |
| 2021/0058928 | A1 * | 2/2021 | Lin | H04W 72/0473 |
| 2022/0070742 | A1 * | 3/2022 | Zhao | H04W 36/16 |
| 2022/0232486 | A1 * | 7/2022 | Caporal Del Barrio | H04B 17/373 |
| 2023/0232334 | A1 * | 7/2023 | Nielsen | H04W 52/367 455/522 |

FOREIGN PATENT DOCUMENTS

| | | | |
|---|---|---|---|
| KR | 1020130038515 | A | 4/2013 |
| KR | 101319962 | B1 | 10/2013 |
| KR | 101722237 | B1 | 3/2017 |
| KR | 101923592 | B1 | 11/2018 |
| WO | 2017166482 | A1 | 10/2017 |
| WO | 2019212504 | A1 | 11/2019 |
| WO | 2020091276 | A1 | 5/2020 |

OTHER PUBLICATIONS

The extended European search report for EP Application No. 21919840.5 mailed on May 24, 2024.

Korean Office Action corresponding to Application No. 10-2021-0005443, Dated Jun. 27, 2025.

European Office Action for European Application No. 21 919 840.5-1206; Report Mail Date Jun. 24, 2026 (7 Pages).

* cited by examiner

FIG. 6

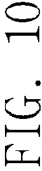
FIG. 10
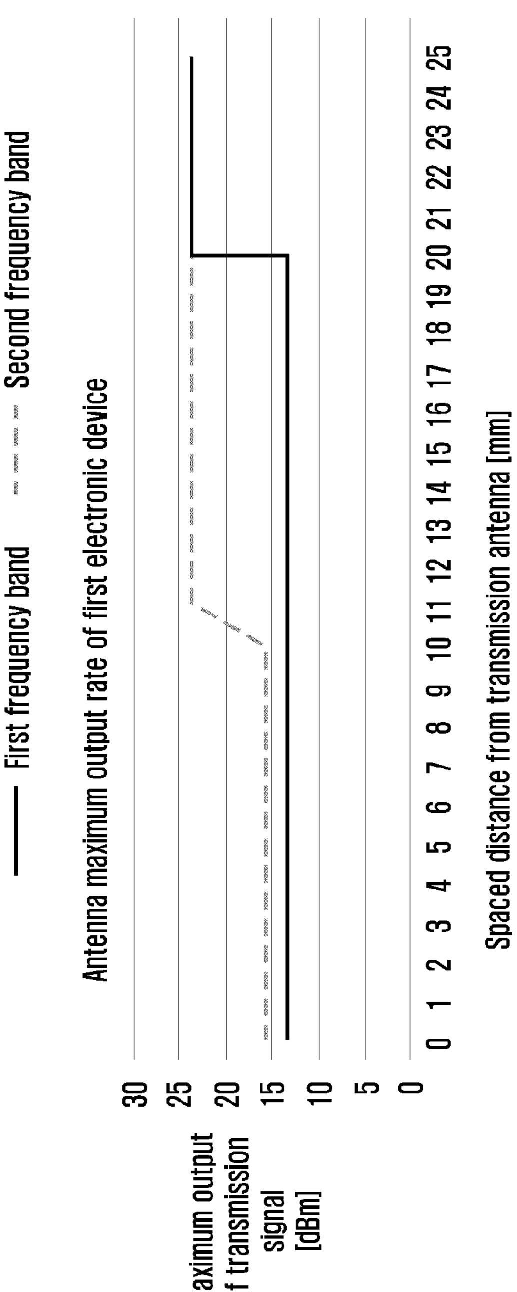

ELECTRONIC DEVICE INCLUDING ANTENNA MODULE TO OUTPUT SIGNAL BASED ON SPECIFIC ABSORPTION RATE IN COMMUNICATION SYSTEM, AND METHOD OF OPERATING SAME

TECHNICAL FIELD

The disclosure relates to a communication system, and more particularly, to an electronic device including an antenna module and a method of operating the same.

BACKGROUND ART

A portable electronic device may transmit electromagnetic waves for data transmission and reception using a wireless communication technology, such as a global system for mobile communication (GSM), general packet radio service (GPRS), or enhanced data rates for GMS evolution (EDGE). To meet the increasing demand for wireless data traffic since the deployment of 4G communication systems, a 5G communication system or pre-5G communication system utilizing higher data rates may utilize a "beyond 4G network" communication system or a "post LTE System." For example, the 5G communication system may utilize ultrahigh frequency (mmWave) bands (e.g., 60 GHz bands).

DISCLOSURE OF INVENTION

Technical Problem

For data transmission and reception using a wireless communication technology, electromagnetic waves may be transmitted. Meanwhile, the electromagnetic waves being radiated from the electronic device may have harmful effects on the human body, and various institutions at home and abroad may limit the electromagnetic waves having harmful effects on the human body.

Solution to Problem

Various embodiments of the disclosure may control a transmission output based on a spaced distance from an electronic device to a user in consideration of the point that electromagnetic wave absorption rates are different depending on frequency bands.

An electronic device according to various embodiments includes: a sensor module, an antenna module, and a processor electrically connected to the sensor module and the antenna module. The processor is configured to: identify a frequency band, identify a spaced distance from the antenna module to a user measured by the sensor module, and determine a power value of a transmission signal for being transmitted through the frequency band based on the frequency band and the spaced distance, and the antenna module is configured to output the transmission signal through the frequency band.

A method of operating an electronic device according to various embodiments includes: identifying a frequency band by using a processor; measuring a spaced distance from an antenna module to a user by using a sensor module; determining a power value of a transmission signal for being transmitted through the frequency band based on the frequency band and the spaced distance by using the processor; and outputting the transmission signal through the frequency band by using the antenna module.

A method of operating an electronic device according to various embodiments includes: determining whether optimization for an output of a transmission signal is necessary by using a processor; identifying a frequency band; identifying whether an output value for the transmission signal is limited in the frequency band; identifying whether another frequency band in which the output value is not limited exists; determining the other frequency band as the frequency band for transmitting the transmission signal in case that the other frequency band exists; determining the output value for the transmission signal; and outputting the transmission signal with the determined output value in the determined frequency band by using an antenna module.

Advantageous Effects of Invention

The electronic device according to various embodiments can increase communication efficiency by transmitting the transmission signal based on the spaced distance from the electronic device to the user in accordance with the frequency band situation being utilized for communication.

BRIEF DESCRIPTION OF DRAWINGS

FIG. 6 is a conceptual diagram illustrating a first electronic device 101 and a second electronic device 201 according to various embodiments.

FIG. 10 is a graph illustrating a maximum output of transmission signal in accordance with a spaced distance from an antenna module 197 for each frequency band in a first electronic device 101 according to various embodiments.

MODE FOR THE INVENTION

Hereinafter, the operation principle of the disclosure will be described in detail with reference to the accompanying drawings. In describing the disclosure, a detailed description of related known functions or configurations will be omitted if it is determined that it obscures the disclosure in unnecessary detail. Further, terms to be described later are terms defined in consideration of their functions in the disclosure, but may differ depending on intentions of a user or an operator, or customs. Accordingly, they should be defined on the basis of the contents of the whole description of the disclosure.

In the following description, a term to identify a communication node or an access node, a term to denote a network entity, a term to denote messages, a term to denote an interface between network entities, and a term to denote various types of identity information have been exemplified for convenience in explanation. Accordingly, the disclosure is not limited to the terms to be described later, and other terms to denote targets having equivalent technical meanings may be used.

Hereinafter, for convenience in explanation, in the disclosure, terms and names defined in the standards for 5GS and NR systems that are the latest standards being defined in the 3rd generation partnership project (3GPP) group among currently existing communication standards are used. However, the disclosure is not restricted by the terms and names, but may be equally applied to a wireless communication network complying with other standards. In particular, the disclosure may be applied to the 3GPP 5GS/NR (5th generation mobile communication standards).

Figure 1:
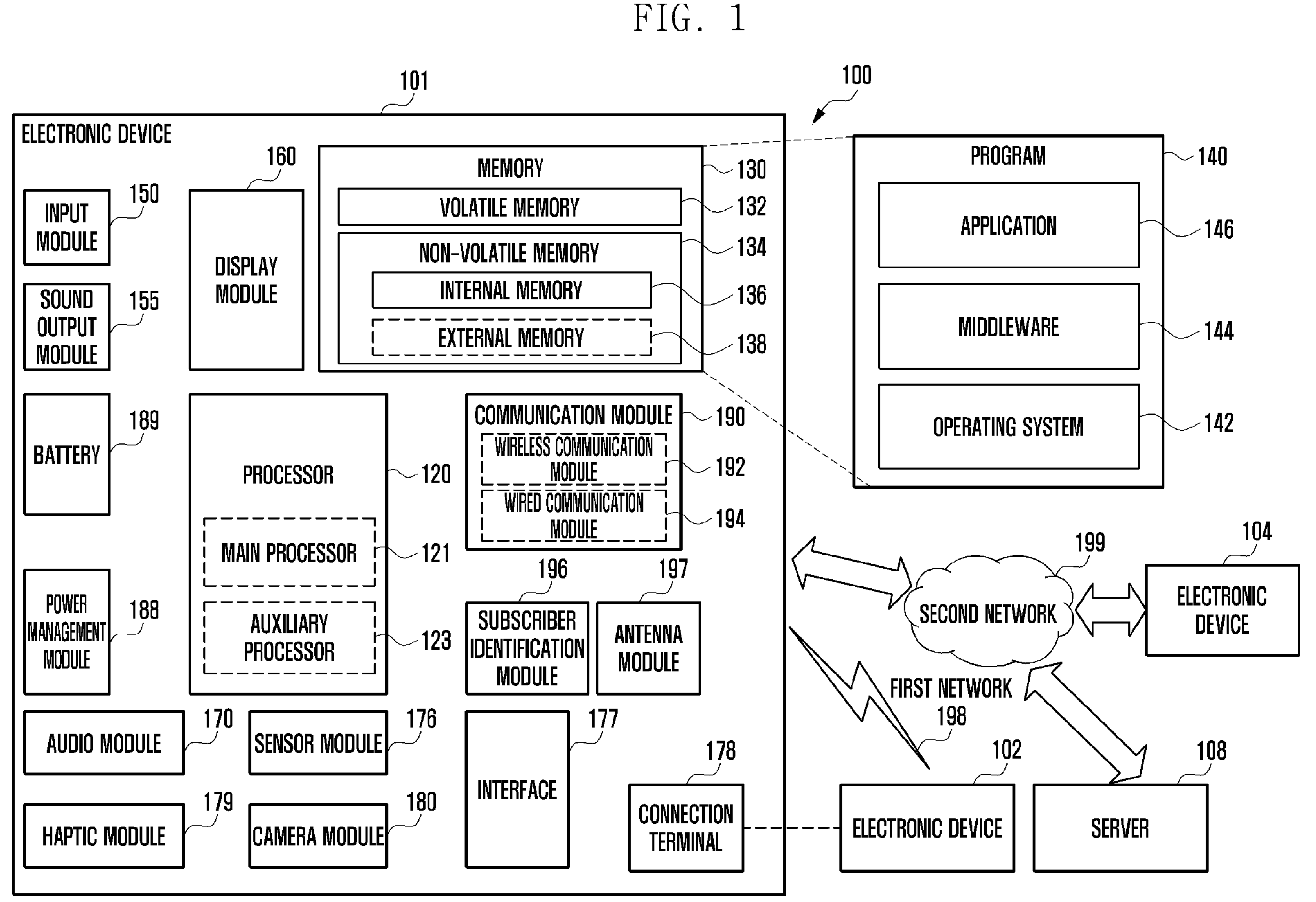
FIG. 1 is a block diagram of an electronic device 101 in a network environment 100 according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments disclosed in the disclosure may be one of various types of devices. The electronic device may include, for example, a portable communication device (e.g., a smartphone), a computer device, a portable multimedia device, a portable medical device, a camera, a wearable device, or a home appliance. According to an embodiment of the disclosure, the electronic device is not limited to the devices described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
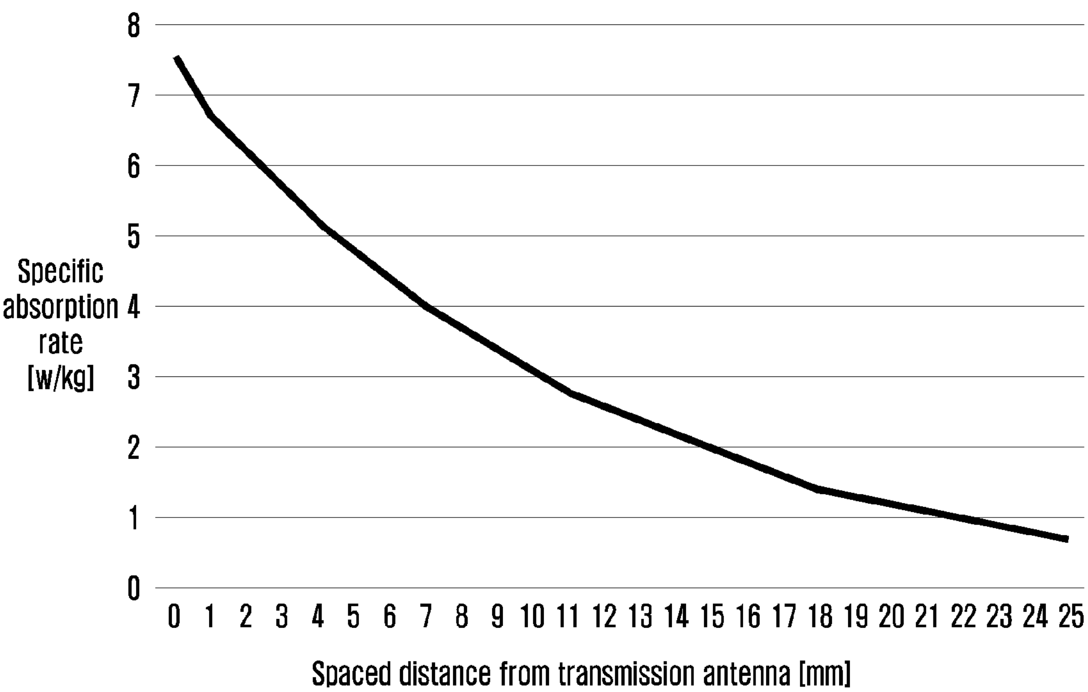
FIG. 2 is a graph illustrating a specific absorption rate in accordance with a spaced distance from an antenna module 197 in a first electronic device 101 according to various embodiments.

FIG. 2 is a graph illustrating a specific absorption rate in accordance with a spaced distance from an antenna module 197 in a first electronic device 101 according to various embodiments.

With reference to FIG. 2, a specific absorption rate (SAR) may be inversely proportional to a spaced distance from an antenna module 197 of a first electronic device 101 to a user. For example, as the spaced distance from the antenna module 197 of the first electronic device 101 to the user is increased, the specific absorption rate may be decreased. As used herein, the "specific absorption rate" is a measure of the rate of radiofrequency (RF) energy absorption by the body (e.g., user) from the source being measured.

The tolerance of the specific absorption rate may differ depending on each country. In each country, the tolerance of the specific absorption rate may be regulated in standards. For example, the tolerance of the specific absorption rate may be limited below a specific range according to the standards of each country. In general, the tolerance of the specific absorption rate according to the standards may be 1.6 watts per kilogram (w/kg).

A sensor module 176 of the first electronic device 101 may measure a capacitance value. A processor 120 of the first electronic device 101 may determine a spaced distance from the antenna module 197 to the user based on variation of the capacitance value measured by the sensor module 176.

The processor 120 may determine the output value of a transmission signal being output through the antenna module 197 based on the spaced distance measured by the sensor module 176. For example, the processor 120 may determine the output value of the transmission signal being output through the antenna module 197 so as to satisfy the tolerance of the specific absorption rate regulated in accordance with the standards.

Figure 3:
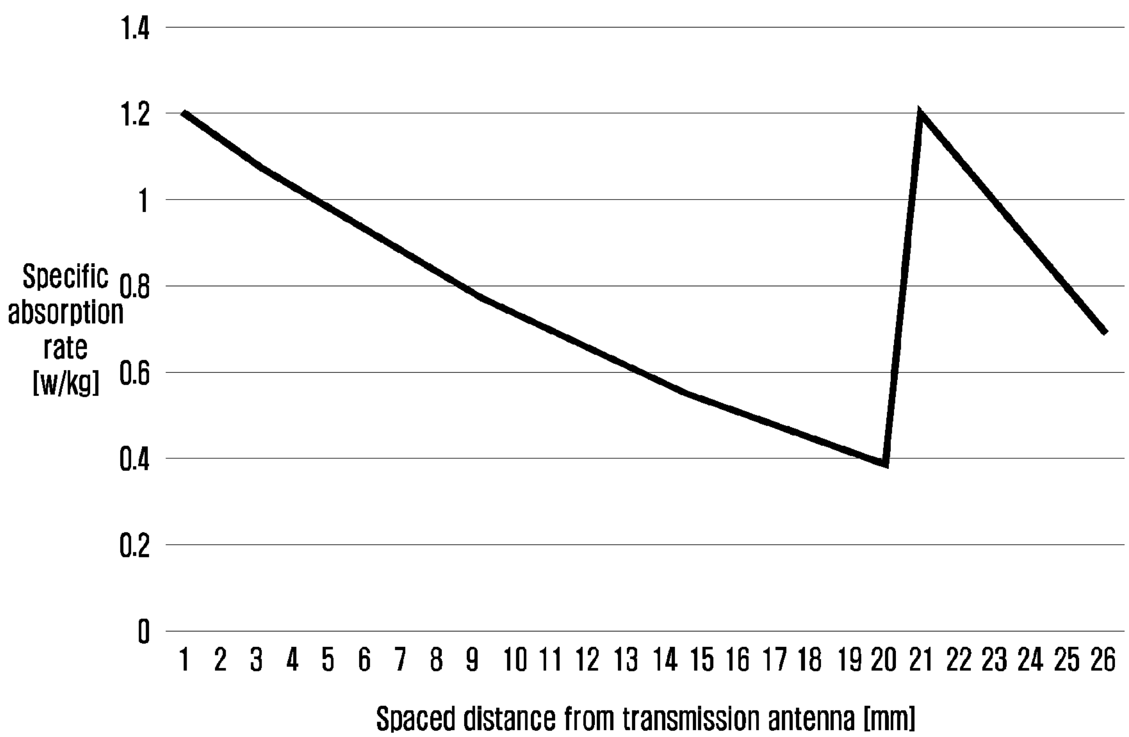
FIG. 3 is a graph illustrating a specific absorption rate in accordance with a spaced distance from a transmission antenna in a first electronic device 101 according to various embodiments.

FIG. 3 is a graph illustrating a specific absorption rate in accordance with a spaced distance from a transmission antenna in a first electronic device 101 according to various embodiments.

With reference to FIG. 3, if the spaced distance from the first electronic device 101 to the user is 0 mm to 20 mm, the transmission signal being output from the antenna module 197 may exert a high influence on the user. The processor 120 of the first electronic device 101 may determine the output value of the transmission signal being output from the antenna module 197 less than a predetermined output value. For example, in order to satisfy 1.6 w/kg that is the tolerance of the specific absorption rate regulated in accordance with the general standards, the processor 120 may determine whether an output intensity value of a signal being output from the antenna module 197 is less than a predetermined output intensity value.

If the spaced distance from the first electronic device 101 to the user exceeds 20 mm, the transmission signal being output from the antenna module 197 may exert a low influence on the user. If the spaced distance from the first electronic device 101 to the user exceeds 20 mm, the processor 120 may determine (e.g., increase) the output value of the transmission signal being output from the antenna module 197 in a range of more than the predetermined output value. According to various embodiments, if the spaced distance from the first electronic device 101 to the user exceeds 20 mm, the processor 120 may determine the output value of the transmission signal being output from the antenna module 197 as the maximum output value. For example, the maximum output value may mean an output value in which the output limit in accordance with the specific absorption rate is not reflected. For example, the maximum output value may mean the original output value of the transmission signal that does not have the output limit.

Figure 4:
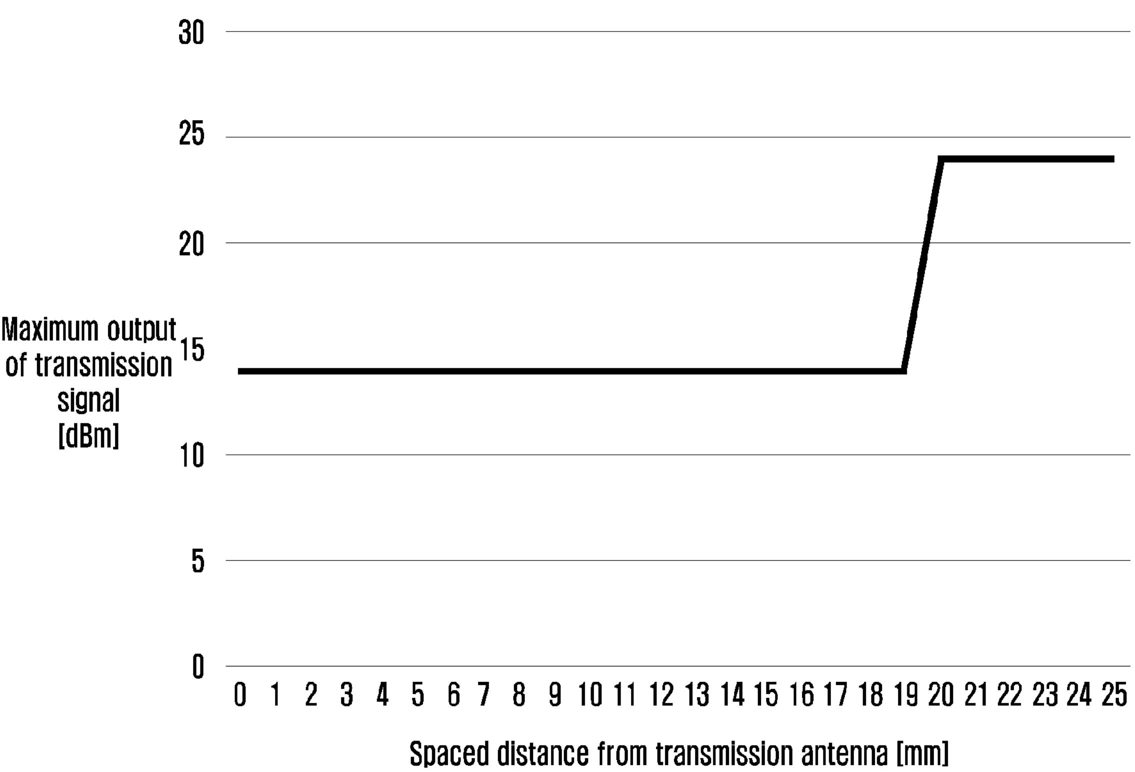
FIG. 4 is a graph illustrating a maximum output value of a transmission signal in accordance with a spaced distance from an antenna module 197 in a first electronic device 101 according to various embodiments.

FIG. 4 is a graph illustrating a maximum output value of a transmission signal in accordance with a spaced distance from an antenna module 197 in a first electronic device 101 according to various embodiments.

With reference to FIG. 4, if the spaced distance from the first electronic device 101 to the user is 0 mm to 20 mm, the processor 120 of the first electronic device 101 may determine the output value of the transmission signal being output from the antenna module 197 as 14 dBm.

If the spaced distance from the first electronic device 101 to the user exceeds 20 mm, the processor 121 may determine the output value of the transmission signal being output from the antenna module 197 so as to exceed 14 dBm. For example, if the spaced distance from the first electronic device 101 to the user exceeds 20 mm, the processor 121 may determine the output value of the transmission signal being output from the antenna module 197 as 24 dBm. The maximum output value that can be output by the antenna module 197 may be 24 dBm.

Figure 5:
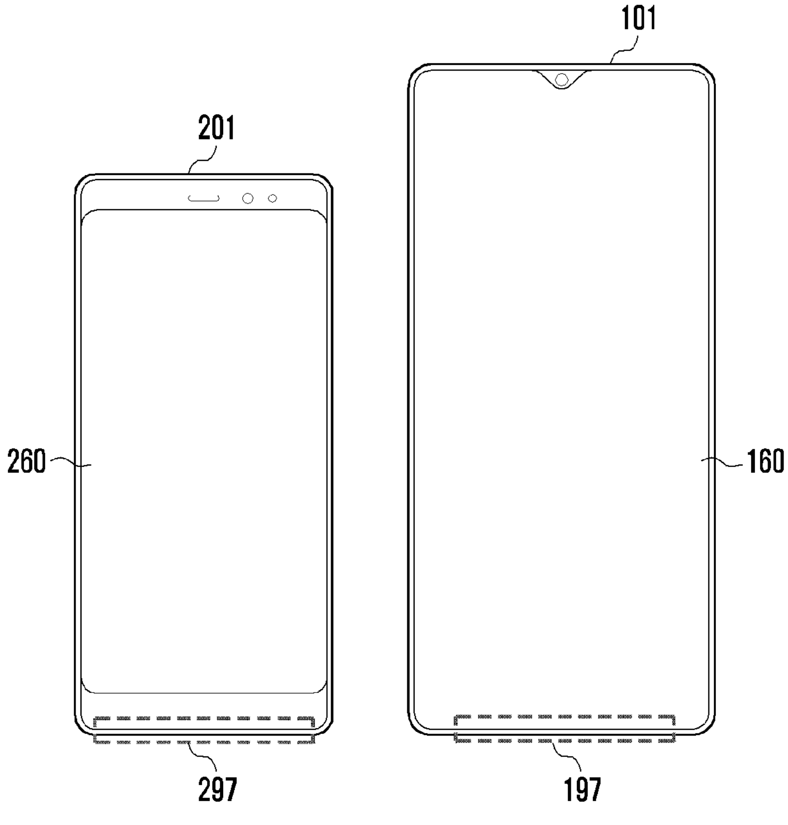
FIG. 5 is a conceptual diagram illustrating a first electronic device 101 and a second electronic device 201 according to various embodiments.

FIG. 5 is a conceptual diagram illustrating a first electronic device 101 and a second electronic device 201 according to various embodiments.

With reference to FIG. 5, an antenna module 197 of the first electronic device 101 may be mounted on a lower end part of the first electronic device 101. An antenna module 297 of the second electronic device 201 may be mounted on a lower end part of the second electronic device 201. Here, the second electronic device 201 may be the same as or may be similar to the electronic device 102 of FIG. 1.

The size of a display module 160 of the first electronic device 101 may be larger than the size of a display module 260 of the second electronic device 201. For example, the first electronic device 101 may be used by a user who prefers a large screen.

Figure 6:
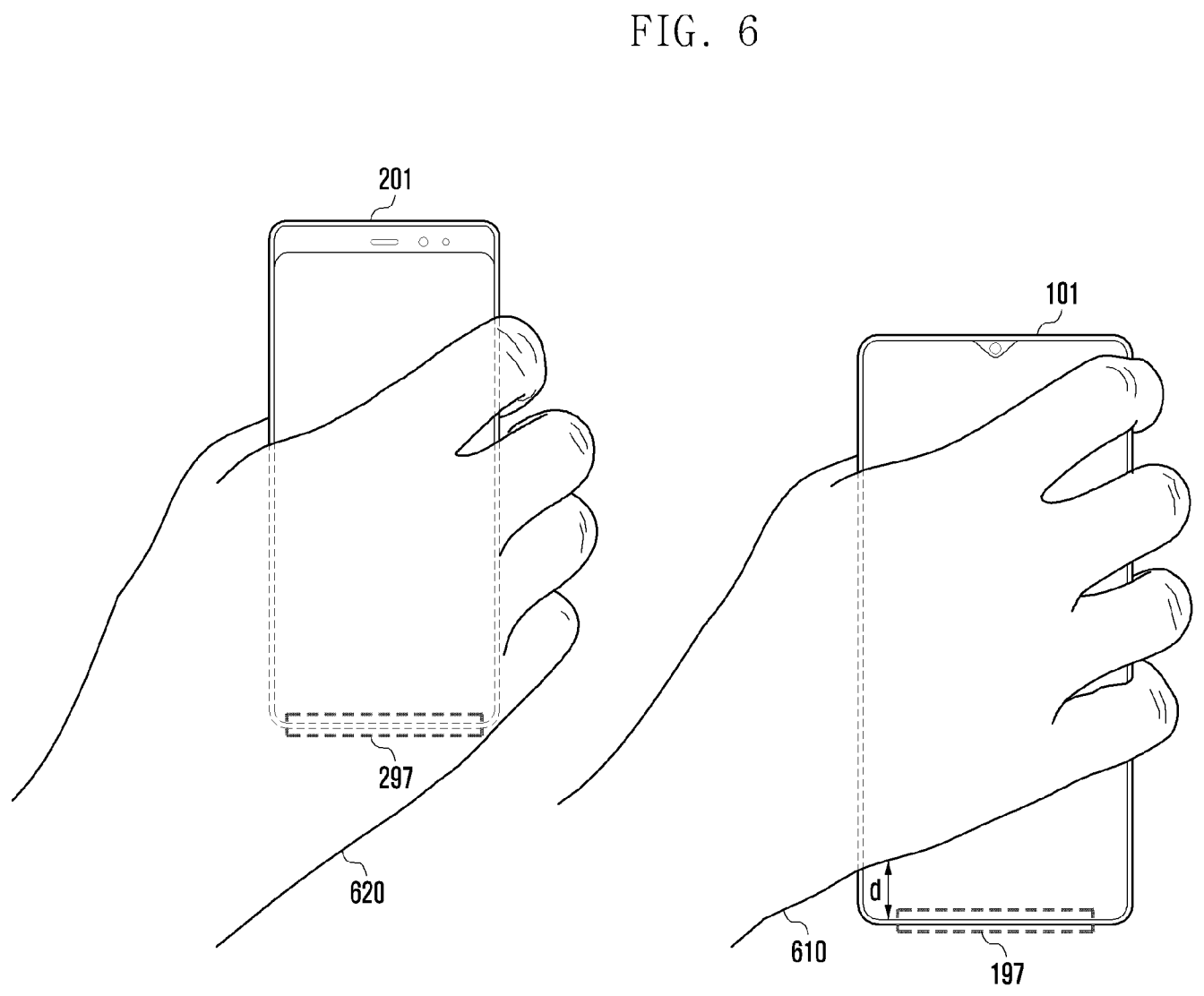

FIG. 6 is a conceptual diagram illustrating a first electronic device 101 and a second electronic device 201 according to various embodiments.

With reference to FIG. 6, the first electronic device 101 may be gripped by a first user 610. The second electronic device 201 may be gripped by a second user 620. The spaced distance d from the antenna module 197 of the first electronic device 101 to the first user 610 (e.g., hand of the user) may be longer than the spaced distance from the antenna module 297 of the second electronic device 201 to the second user 620.

For example, the spaced distance d from the antenna module 197 of the first electronic device 101 to the first user 610 may exceed a predetermined distance. The spaced distance from the antenna module 297 of the second electronic device 201 to the second user 620 may approach 0 mm.

According to various embodiments, if the larger first electronic device 101 is gripped by the user, the spaced distance from the antenna module 197 of the first electronic device 101 to the user may be increased. For example, if the spaced distance from the antenna module 197 of the first electronic device 101 to the user is increased, the harmful influence of the transmission signal being output from the antenna module 197, which is exerted on the user, may be reduced.

The processor 120 of the first electronic device 101 may determine the output value of the antenna module 197 based on the spaced distance d between the antenna module 197 and the first user 610.

For example, the spaced distance in which the maximum output is limited may differ depending on the frequency band. For example, the spaced distance in which the maximum output is limited depending on the frequency band may be referred to as the maximum spaced distance or a reference distance.

TABLE 1

| RF Band | Transmission frequency band [MHz] | Spaced distance [mm] in which the maximum output is limited |
|---|---|---|
| Band 1 | 1920-1980 | 20 |
| Band 2 | 1850-1910 | 19 |
| Band 3 | 1710-1785 | 20 |
| Band 4 | 1710-1755 | 18 |
| Band 5 | 824-849 | 10 |
| Band 7 | 2500-2570 | 20 |
| Band 8 | 880-915 | 11 |
| Band 12 | 698-716 | 12 |
| Band 13 | 777-787 | 12 |
| Band 20 | 832-862 | 11 |
| Band 25 | 1850-1915 | 19 |
| Band 26 | 814-849 | 11 |
| Band 30 | 2305-2315 | 20 |

With reference to Table 1, the frequency band equal to or lower than 1 GHz may be classified into a low band. For example, band 5, band 8, band 12, band 13, band 20, and band 28 may be classified into low bands. The frequency band equal to or higher than 1.5 GHz may be classified into a mid/high band. For example, band 1, band 2, band 3, band 4, band 7, band 25, band 26, and band 30 may be classified into mid/high bands.

The directivity of a radiation pattern of electromagnetic waves being radiated in the mid/high band may be higher than the directivity of a radiation pattern of electromagnetic waves being radiated in the low band. For example, the specific absorption rate of the transmission signal being radiated in the mid/high band may be higher than the specific absorption rate of the transmission signal being radiated in the low band.

For example, in consideration of the tolerance of the specific absorption rate regulated in accordance with the general standards, the maximum spaced distance in which the output of the transmission signal being radiated in the mid/high band is limited may be longer than the maximum spaced distance in which the output of the transmission signal being radiated in the low band is limited.

According to various embodiments, in terms of frequency band signals in the same low or mid/high band, the maximum spaced distance in which the maximum output is limited may not be proportional to the frequency.

Figure 7:
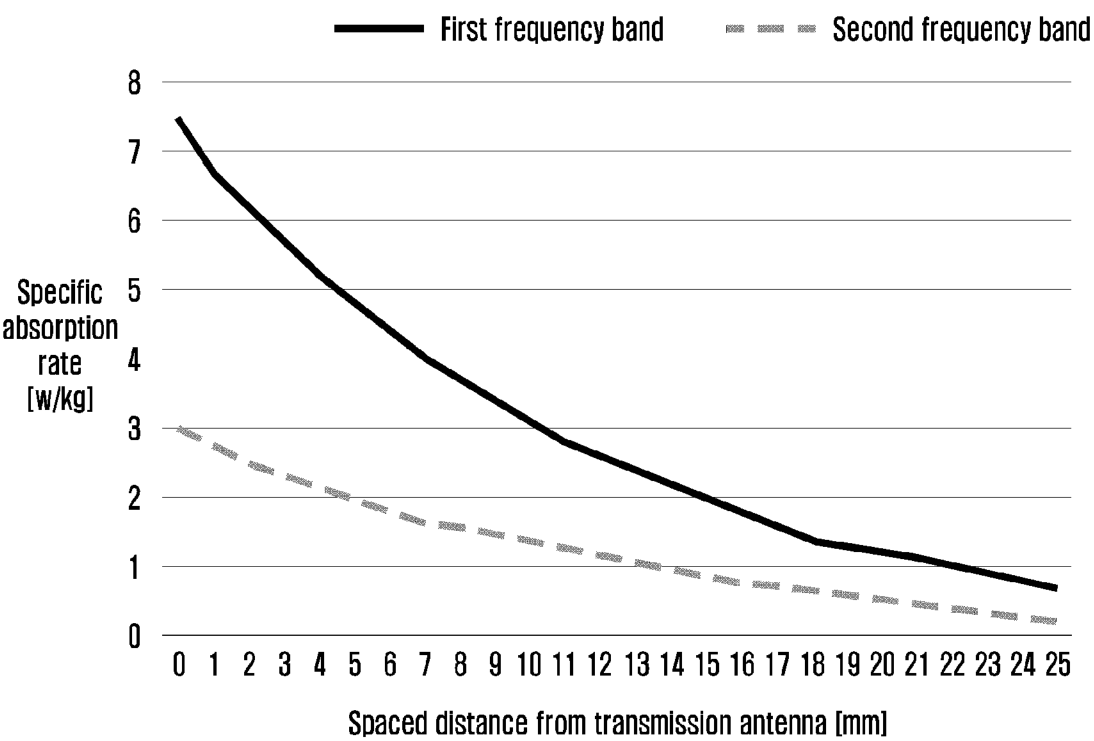
FIG. 7 is a graph illustrating a specific absorption rate in accordance with a spaced distance from an antenna for each frequency band in a first electronic device 101 according to various embodiments.

FIG. 7 is a graph illustrating a specific absorption rate in accordance with a spaced distance from an antenna for each frequency band in a first electronic device 101 according to various embodiments.

With reference to FIG. 7, the specific absorption rate of the transmission signal being output from the antenna module 197 in accordance with the spaced distance between the antenna module 197 of the first electronic device 101 and the user 610 may differ depending on the frequency band.

For example, if the spaced distance d between the antenna module 197 and the user 610 is 0 mm to 20 mm, the specific absorption rate of the transmission signal being radiated from the antenna module 197 in the first frequency band may exceed 1.6 w/kg. If the spaced distance d between the antenna module 197 and the user 610 is equal to or larger than 20 mm, the specific absorption rate of the transmission signal being radiated from the antenna module 197 in the first frequency band may be equal to or smaller than 1.6 w/kg.

If the spaced distance d between the antenna module 197 and the user 610 is 0 mm to 10 mm, the specific absorption rate of the transmission signal being radiated from the antenna module 197 in the second frequency band may exceed 1.6 w/kg. If the spaced distance d between the antenna module 197 and the user 610 is equal to or larger than 10 mm, the specific absorption rate of the transmission signal being radiated from the antenna module 197 in the second frequency band may be equal to or smaller than 1.6 w/kg. Here, the second frequency band is lower than the first frequency band.

The specific absorption rate of the transmission signal being radiated from the antenna module 197 in the first frequency band may be higher than the specific absorption rate of the transmission signal being radiated from the antenna module 197 in the second frequency band. For example, the spaced distance d, in which the output of the transmission signal in the first frequency band is limited, between the antenna module 197 and the user 610 may be larger than the spaced distance in which the output of the transmission signal in the second frequency band is limited. For example, in the first frequency band, the output of the transmission signal may be limited up to the spaced distance that is longer than that in the second frequency band.

The spaced distance d, in which the output of the transmission signal in the second frequency band is limited, between the antenna module 197 and the user 610 may be smaller than the spaced distance in which the output of the transmission signal in the first frequency band is limited. For example, in the second frequency band, the output of the transmission signal may be limited up to the spaced distance that is shorter than that in the first frequency band.

Figure 8:
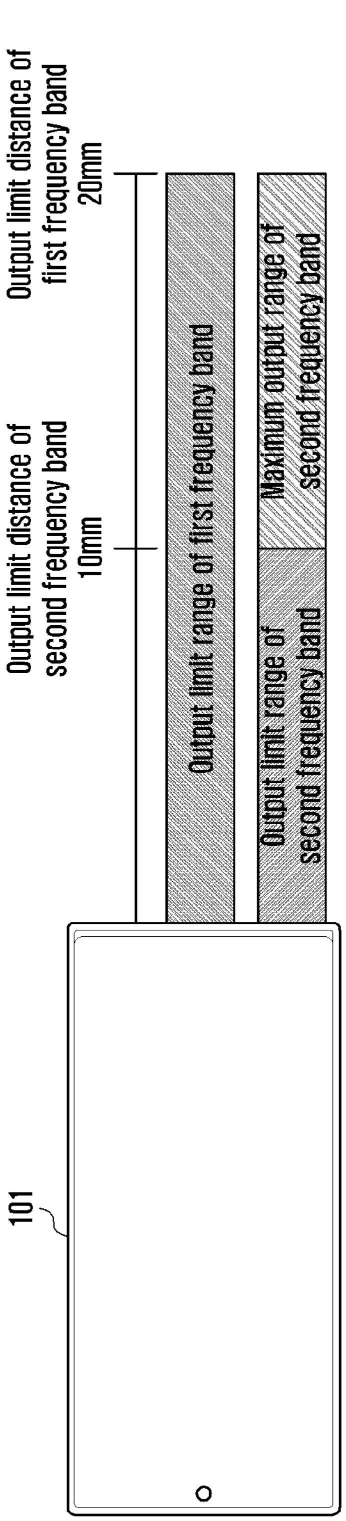
FIG. 8 is a conceptual diagram illustrating a spaced distance range in which a maximum output of a transmission signal for each frequency band is limited in a first electronic device 101 according to various embodiments.

FIG. 8 is a conceptual diagram illustrating a spaced distance range in which a maximum output of a transmission signal for each frequency band is limited in a first electronic device 101 according to various embodiments.

With reference to FIG. 8, the first electronic device 101 may differently determine the maximum output value of the transmission signal in accordance with the spaced distance between the antenna module 297 and the user 610 in accordance with the frequency band. For example, if the spaced distance between the antenna module 197 and the user 610 in the first frequency band is 0 mm to 20 mm, the first electronic device 101 may limit the output for the transmission signal. If the spaced distance between the antenna module 197 and the user 610 in the first frequency band exceeds 20 mm, the first electronic device 101 may not limit the output for the transmission signal. That is, if the spaced distance between the antenna module 197 and the user 610 in the first frequency band exceeds 20 mm, the first electronic device 101 may determine the output value of the transmission signal as the maximum output value.

If the spaced distance between the antenna module 197 and the user 610 in the second frequency band is 0 mm to 10 mm, the first electronic device 101 may limit the maximum output for the transmission signal. If the spaced distance between the antenna module 197 and the user 610 in the second frequency band exceeds 10 mm, the first electronic device 101 may not limit the maximum output for the transmission signal. That is, if the spaced distance between the antenna module 197 and the user 610 in the second frequency band exceeds 10 mm, the first electronic device 101 may determine the output value of the transmission signal as the maximum output value.

Figure 9:
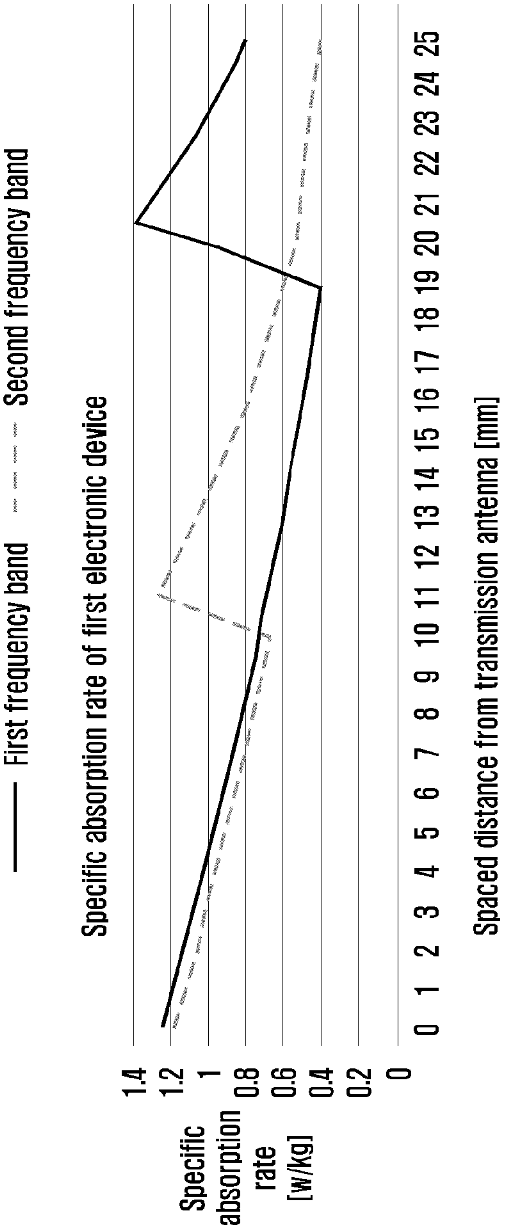
FIG. 9 is a graph illustrating a specific absorption rate in accordance with a spaced distance from an antenna module 197 for each frequency band in a first electronic device 101 according to various embodiments.

FIG. 9 is a graph illustrating a specific absorption rate in accordance with a spaced distance from an antenna module 197 for each frequency band in a first electronic device 101 according to various embodiments.

With reference to FIG. 9, the specific absorption rate for the transmission signal being output from the antenna module 197 of the first electronic device 101 in the first frequency band may be inversely proportional to the spaced distance from the antenna module 197 to the user 610.

Since the first electronic device 101 may differently determine the output value of the transmission signal in accordance with the spaced distance between the antenna module 297 and the user 610 depending on the first frequency band and the second frequency band, the graph pattern of the specific absorption rate in the second frequency band may be different from the graph pattern of the specific absorption rate in the first frequency band.

FIG. 10 is a graph illustrating a maximum output of transmission signal in accordance with a spaced distance from an antenna module 197 for each frequency band in a first electronic device 101 according to various embodiments.

With reference to FIG. 10, the first electronic device 101 may determine the output value of the transmission signal being output from the antenna module 297 in accordance with the spaced distance from the antenna module 197 to the user 610 and the kind of frequency band as a limited output value. For example, the first electronic device 101 may determine the limited output value when the spaced distance from the antenna module 197 to the user 610 is less than a certain amount so that the specific absorption rate is within the tolerance of 1.6 w/kg.

For example, if the spaced distance from the antenna module 197 to the user 610 in the first frequency band is 0 mm to 20 mm, the first electronic device 101 may determine the output value of the transmission signal being output from the antenna module 197 as the limited output value. For example, the limited output value may have various values. For example, if the spaced distance from the antenna module 197 to the user 610 in the first frequency band is 0 mm to 20 mm, the limited output value in the first frequency band may be 14 dBm.

If the spaced distance from the antenna module 197 to the user 610 in the second frequency band is 0 mm to 10 mm, the first electronic device 101 may determine the output value of the transmission signal being output from the antenna module 197 as the limited output value. For example, the limited output value may have various values. For example, if the spaced distance from the antenna module 197 to the user 610 in the second frequency band is 0 mm to 10 mm, the limited output value in the second frequency band may be 16 dBm.

If the spaced distance from the antenna module 197 to the user 610 in the second frequency band exceeds 10 mm, the first electronic device 101 may determine the output value of the transmission signal as the maximum output value. For example, if the spaced distance from the antenna module 197 to the user 610 in the second frequency band exceeds 10 mm, the first electronic device 101 may determine the output value of the transmission signal as 24 dBm that is the maximum output value.

Figure 11:
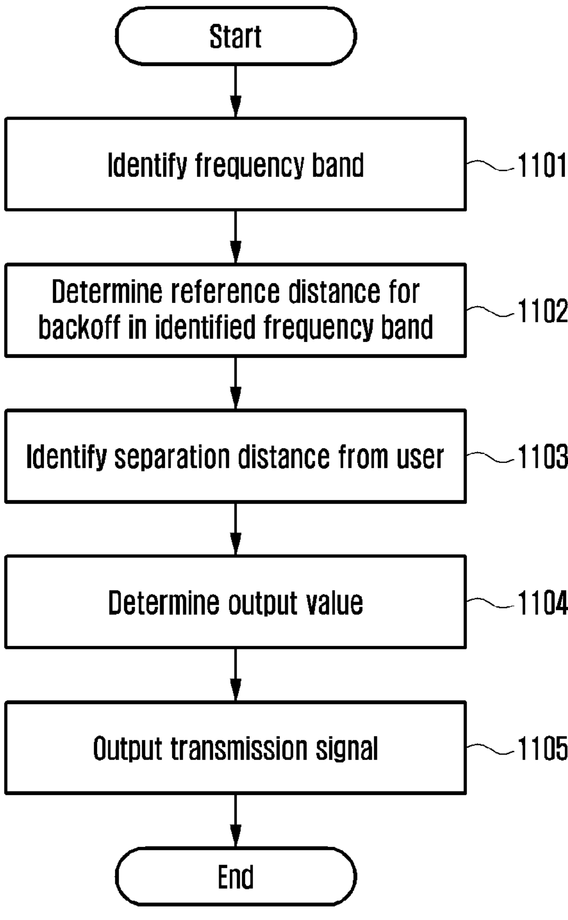
FIG. 11 is a flowchart illustrating an operation order of an electronic device according to various embodiments.

FIG. 11 is a flowchart illustrating an operation order of an electronic device according to various embodiments.

With reference to FIG. 11, the first electronic device 101 may identify the frequency band (1101). For example, the processor 120 of the first electronic device 101 may identify the frequency band for transmitting the transmission signal.

The first electronic device 101 may determine a reference distance for backoff in the identified frequency band (1102). For example, the processor 120 of the first electronic device 101 may determine the reference distance from the antenna module 197 to the user 610, in which the output value of the transmission signal in the identified frequency band is limited. For example, the processor 120 may determine the reference distance based on the Table 1.

The first electronic device 101 may identify the spaced distance (in other words, separation distance) from the user 610 (1103). For example, the sensor module 176 of the first electronic device 101 may measure the spaced distance d between the antenna module 197 and the user 610 of the first electronic device 101. For example, the sensor module 176 may measure the spaced distance d between the antenna module 197 and the user 610 of the first electronic device 101.

The first electronic device 101 may determine the output value for the transmission signal (1104). For example, the processor 120 of the first electronic device 101 may determine the output value for the transmission signal based on the identified spaced distance d.

The first electronic device 101 may output the transmission signal (1105). For example, the antenna module 197 of the first electronic device 101 may output the transmission signal as the output value determined through the identified frequency band.

Figure 12:
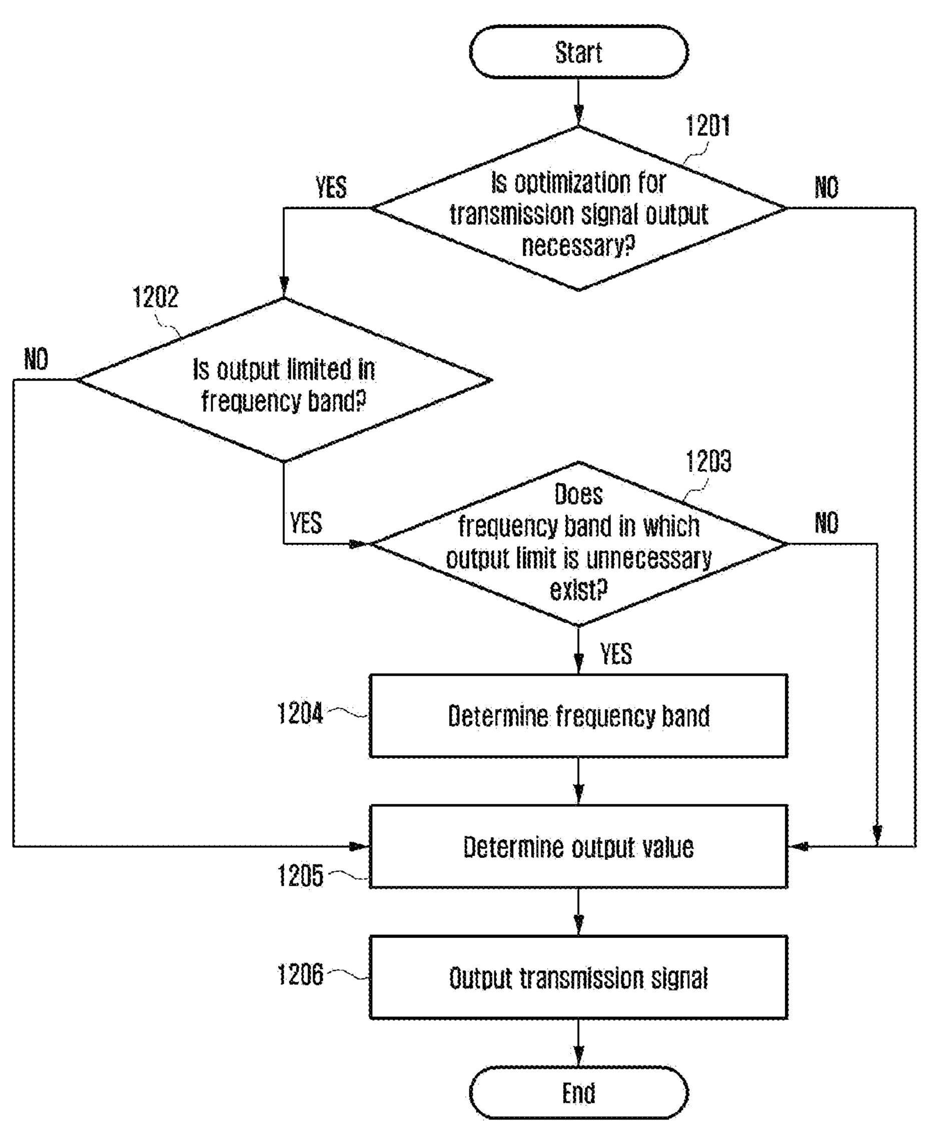
FIG. 12 is a flowchart illustrating an operation order of an electronic device according to various embodiments.

FIG. 12 is a flowchart illustrating an operation order of an electronic device according to various embodiments.

With reference to FIG. 12, the first electronic device 101 may determine whether optimization for the output of the transmission signal is necessary (1201). For example, the antenna module 197 of the first electronic device 101 may output the transmission signal in the first frequency band. The processor 120 of the first electronic device 101 may determine the electric field value of the transmission signal in the first frequency band. If the electric field value of the transmission signal in the first frequency band is smaller than a predetermined electric field value, the processor 120 may determine that the optimization for the output of the transmission signal is necessary. If it is determined that the optimization for the output of the transmission signal is necessary, the processor 120 of the first electronic device 101 may perform step 1202.

Further, if it is determined that the optimization for the output of the transmission signal is not necessary, the processor 120 of the first electronic device 101 may perform step 1205.

If it is determined that the optimization for the output of the transmission signal is necessary, the first electronic device 101 may determine whether the maximum output for the transmission signal in the first frequency band is limited (1202). For example, the sensor module 176 of the first electronic device 101 may measure the spaced distance d between the antenna module 197 and the user 610 of the first electronic device 101. For example, the sensor module 176 may measure the spaced distance d between the antenna module 197 and the user 610 of the first electronic device 101 based on the variation of capacitance according to locations in the first electronic device 101. The processor 120 of the first electronic device 101 may determine whether it is possible to transmit the transmission signal with the maximum output in the first frequency band based on the spaced distance d measured through the sensor module 176.

If it is not possible to transmit the transmission signal with the maximum output through the first frequency band in the measured spaced distance d, the processor 120 of the first electronic device 101 may perform the step 1203. Further, if it is possible to transmit the transmission signal with the maximum output through the first frequency band in the measured spaced distance d, the processor 120 of the first electronic device 101 may perform step 1205.

If it is not possible to transmit the transmission signal with the maximum output through the first frequency band in the measured spaced distance d, the first electronic device 101 may determine whether another frequency band in which the maximum output for the transmission signal in the spaced distance d exists (1203). For example, the processor 120 of the first electronic device 101 may determine whether another frequency band in which the transmission signal can be transmitted with the maximum output in the measure spaced distance d exists If it is determined that another frequency band in which the maximum output for the transmission signal in the spaced distance d exists, the first electronic device 101 may determine the frequency band in which the transmission signal can be transmitted with the maximum output value (1204). If it is possible to transmit the transmission signal with the maximum output through the second frequency band in the measured spaced distance d, the processor 120 of the first electronic device 101 may change the used frequency from the first frequency band to the second frequency band. For example, the processor 120 may determine the frequency band in which the transmission signal can be transmitted with the maximum output in the measured spaced distance d based on the Table 1. For example, the processor 120 may determine the second frequency band based on the measured spaced distance d.

The first electronic device 101 may determine the output value of the transmission signal in order to be transmitted through the determined frequency band (1205). For example, the processor 120 of the first electronic device 101 may determine the output value of the transmission signal for being transmitted in the second frequency band as the maximum output value that can be output by the antenna module 197. Further, the processor 120 of the first electronic device 101 may determine the output value of the transmission signal for being transmitted in the first frequency band or in the frequency band optimized for reception as the maximum output value that can be output by the antenna module 197.

The first electronic device 101 may transmit the transmission signal with the determined output value in the determined frequency band (1206). For example, the antenna module 197 of the first electronic device 101 may transmit the transmission signal with the maximum output in the second frequency band. Further, for example, the antenna module 197 of the first electronic device 101 may transmit the transmission signal with the maximum output in the first frequency band or in the frequency band optimized for reception.

In an embodiment, the processor 120 may determine a load value of the communication module 190 for the transmission signal, and determine the frequency band in which the transmission signal is able to be transmitted with the maximum output based on the spaced distance in case that the load value of the communication module 190 exceeds a predetermined threshold load value of the communication module 190. The communication module 190 electrically connected to the antenna module 197 may generate the transmission signal that is able to be transmitted with a maximum output in the determined frequency band.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Although detailed embodiments have been described in the detailed description of the disclosure, it is apparent that various modifications are possible without departing from the scope of the disclosure. Accordingly, the scope of the disclosure should not be limited to the embodiments described above, but should be defined by not only the scope of the appended claims but also equivalents of the scope of the claims.

INDUSTRIAL APPLICABILITY

The disclosure may be used in electronics industry and information communication industry.

What is claimed is:

1. An electronic device comprising:

a sensor module;

an antenna module; and a processor electrically connected to the sensor module and the antenna module, wherein the processor is configured to:

identify a first frequency band, determine, based on an electric field value of a transmission signal in the first frequency band being weaker than a predetermined electric field value, that an optimization for an output of the transmission signal is necessary, determine whether a maximum output for the transmission signal in the first frequency band is limited, the determining comprising:

identifying a spaced distance from the antenna module to a user measured by the sensor module, and determining whether the spaced distance is shorter than a first predetermined spaced distance in which a specific absorption rate of a transmission signal for transmission through the first frequency band is equal to a predetermined tolerance value, and responsive to the maximum output being limited in the first frequency band, determine whether another frequency band exists in which the maximum output for the transmission signal is allowed, thereby preventing a power backoff, the determining comprising:

in case the spaced distance is shorter than the first predetermined spaced distance, determining whether a second frequency band, in which the spaced distance is equal to or greater than a second predetermined spaced distance in which a specific absorption rate of a transmission signal for transmission through the second frequency band is equal to the predetermined tolerance value, exists, wherein the antenna module is configured to change a frequency band, in which a transmission signal is to be output, from the first frequency band to the second frequency band.

2. The electronic device of claim 1, wherein the processor is configured to:

in case the second frequency band does not exist, transmit the transmission signal through the first frequency band with a limited power value.

3. The electronic device of claim 1, wherein the first frequency band is a radio frequency band at a higher frequency than the second frequency band.

4. The electronic device of claim 3, wherein the first frequency band is equal to or higher than 1.5 GHz and the second frequency band is equal to or lower than 1 GHz.

5. The electronic device of claim 1, wherein the first predetermined spaced distance is 20 mm, and the second predetermined spaced distance is 10 mm.

6. The electronic device of claim 1, further comprising a communication module electrically connected to the antenna module, wherein the communication module is configured to generate the transmission signal that is able to be transmitted with a maximum output in the second frequency band.

7. A method of operating an electronic device comprising:

identifying a first frequency band by using a processor;

determining, based on an electric field value of a transmission signal in the first frequency band being weaker than a predetermined electric field value, that an optimization for an output of the transmission signal is necessary;

determining whether a maximum output for the transmission signal in the first frequency band is limited, the determining comprising:

measuring a spaced distance from an antenna module to a user by using a sensor module; and determining whether the spaced distance is shorter than a first predetermined spaced distance in which a specific absorption rate of a transmission signal for transmission through the first frequency band is equal to a predetermined tolerance value;

responsive to the maximum output being limited in the first frequency band, determining whether another frequency band exists in which the maximum output for the transmission signal is allowed, thereby preventing a power backoff, the determining comprising:

in case the spaced distance is shorter than the first predetermined spaced distance, determining whether a second frequency band, in which the spaced distance is equal to or greater than a second predetermined spaced distance in which a specific absorption rate of a transmission signal for transmission through the second frequency band is equal to the predetermined tolerance value, exists; and changing a frequency band, in which a transmission signal is to be output, from the first frequency band to the second frequency band by using the antenna module.

8. The method of claim 7, wherein the method comprises:

in case the second frequency band does not exist, transmitting the transmission signal through the first frequency band with a limited power value.

9. The method of claim 7, wherein the first frequency band is a radio frequency band at a higher frequency than the second frequency band.

10. The method of claim 9, wherein the first frequency band is equal to or higher than 1.5 GHz and the second frequency band is equal to or lower than 1 GHz.

* * * * *